(12) United States Patent
Schulte

(10) Patent No.: US 8,302,367 B2
(45) Date of Patent: Nov. 6, 2012

(54) FLOOR COVERING AND INSTALLATION METHOD

(76) Inventor: Guido Schulte, Rüthen-Meiste (DE)

( * ) Notice: Subject to any disclaimer, the term of this patent is extended or adjusted under 35 U.S.C. 154(b) by 749 days.

(21) Appl. No.: 12/376,491

(22) PCT Filed: Aug. 10, 2007

(86) PCT No.: PCT/DE2007/001425
§ 371 (c)(1), (2), (4) Date: Feb. 5, 2009

(87) PCT Pub. No.: WO2008/017301
PCT Pub. Date: Feb. 14, 2008

(65) Prior Publication Data
US 2011/0225921 A1    Sep. 22, 2011

(30) Foreign Application Priority Data

Aug. 10, 2006 (DE) .................. 10 2006 037 614
Mar. 30, 2007 (WO) ............... PCT/DE2007/000584

(51) Int. Cl.
*E04B 1/00* (2006.01)

(52) U.S. Cl. ..... 52/747.11; 52/391; 52/582.2; 52/588.1; 428/50

(58) Field of Classification Search ............... 52/578, 52/588.1, 592.1, 390, 392, 533, 534, 553, 52/582.1, 586.2, 589.1, 590.2, 590.3, 591.31–591.5, 52/592.2, 592.4, 745.08, 745.19, 747.1, 747.11, 52/748.1, 539, 127.5–127.7; 403/334, 345, 403/364–368, 372, 375, 376, 381; 404/34, 404/35, 40, 41, 46, 47, 49–58, 68, 70; 428/44, 428/47–50, 57, 58, 60, 61, 106, 192–194
See application file for complete search history.

(56) References Cited

U.S. PATENT DOCUMENTS

| | | | | |
|---|---|---|---|---|
| 5,476,699 A | * | 12/1995 | Hurvitz et al. | ... 428/57 |
| 6,854,235 B2 | * | 2/2005 | Martensson | ... 52/601 |
| 2004/0211143 A1 | * | 10/2004 | Hanning | ... 52/578 |

FOREIGN PATENT DOCUMENTS

| | | |
|---|---|---|
| DE | 101 38 285 A1 | 3/2003 |
| DE | 202005012603 | 10/2005 |
| EP | 1 650 375 A1 | 4/2006 |
| WO | WO 00/47841 * | 8/2000 |
| WO | WO03/016654 A | 2/2003 |
| WO | WO2006/043893 A | 4/2006 |

\* cited by examiner

*Primary Examiner* — William Gilbert
(74) *Attorney, Agent, or Firm* — Henry M. Feiereisen LLC

(57) ABSTRACT

Floor covering comprising a plurality of unit panels (1) laid in a pattern, these panels being provided on their head sides (2, 3) and on their longitudinal sides (4, 5) with locking strips (6, 7) which engage with one another in the assembled position in which unit panels (1) are arranged adjacently within a covering, wherein grooves (19, 20) are provided in the head sides (2, 3) and wherein the grooves (19, 20) of two abutting head sides (2, 3) correspond and form a locking channel (21) intended to accommodate a head tongue (22, 22*a-k*). The head tongue (22) is preassembled in the groove (20) and projects beyond an end of the groove (20) that faces the longitudinal side (5) of the unit panel (1). At the same time, the head tongue (22) in the preassembled state is embedded completely within the groove (20) and can be displaced at least partially from one groove (20) into the corresponding groove (19) of the adjacent unit panel (1) by sliding the projecting end (24) of the head tongue (22) into the groove (20).

20 Claims, 6 Drawing Sheets

FLOOR COVERING AND INSTALLATION METHOD

BACKGROUND OF THE INVENTION

The invention relates to a floor covering and to an installation method.

Prefinished parquet, hardwood floors or laminate floors are constructed from several rows of floorboards having a largely rectangular configuration. Conventional floorboards have on one longitudinal side and one head face continuous grooves, and on the corresponding opposite longitudinal side or head face continuous tongues which formfittingly match the grooves. The floorboards are installed by joining grooves and tongues, whereby the floorboards of two adjacent rows are arranged with a mutual offset.

It is known to provide on the grooves and tongues mechanical locking means which lockingly engage in adjacent floorboards of the floor covering. This arrangement is intended to prevent gaps from forming in the installed floor covering due to expansion or contraction processes. Matching locking elements are formed on the groove and tongue of the floorboards as indentations, recesses or projections, to hold connected floorboards in the joined position without an adhesive.

The floorboards are sometimes difficult to install. Once the mechanical locking elements between groove and tongue are interlocked in the longitudinal side or head face, it becomes often difficult to establish the formfitting connection for the respective other side. Typically, the floorboards are rotated or latched into each other along their longitudinal sides and subsequently displaced laterally, so that the locking rails engage at the head faces. To this end, gentle hammer strokes can be applied from the opposite head face by using a tamping block. There is, however, the risk that the floorboards can be damaged even when taking great care.

DE 20 2005 012 603 U1 addresses this problem by providing grooves in the head faces of the floorboards, wherein the grooves of two abutting head faces correspond with one another and form a channel, in which afterwards a spring is inserted, which bridges the joint between the two floorboards and thereby stabilizes the connection between the floorboards. The spring ensures a high load bearing capacity of the joint region in the vertical direction.

The subject matter described in DE 101 38 285 A1A proposes a similar solution. Therein a locking element bridging the joint can be inserted into a locking recess by pushing or hammering. The tolerances of the locking element and the locking recess can be designed such that the locking element can be easily or tightly inserted into the locking recess.

EP 1 650 375 A1 discloses an alternative to a later insertion of the locking element or of a separate locking tongue. In this approach, one groove at a head face has a locking tongue made of an elastic plastic. The locking tongue is beveled on the top side and retreats completely into the groove at the head face when an abutting floorboard is installed at the head face, and springs into the corresponding groove at the head face of the abutting floorboard, due to the resilient effect of the plastic material, so that they mutually interlock. This obviates the need for subsequent insertion of the locking tongue on the head face.

SUMMARY OF THE INVENTION

It is an object of the invention to improve installation of a floor covering made of floorboards. An improved installation method with these properties is also disclosed.

According to one aspect of the invention, the object is attained by a devise by a floor covering which includes a plurality of interlockable floorboards which have at their head faces and at their longitudinal sides interlocking rails engaging in the installation position with adjacent floorboards of the floor covering, wherein grooves are provided in the head faces, and wherein the grooves of two abutting head faces are aligned and form a locking channel for receiving a locking tongue, wherein the locking tongue is preinstalled in one of the grooves, wherein the locking tongue protrudes beyond an end of the groove facing the longitudinal site of the floorboard and can be moved from the one groove into the corresponding groove of the adjacent floorboard by moving the protruding end of the locking tongue partially into the groove.

According to one aspect of the invention, the object is attained by an Installation method for a floor covering, wherein a plurality of interlockable floorboards are interlocked by locking rails arranged at their head faces and at their longitudinal sides, so that adjacent floorboards interlock with one another, and wherein the head faces are interlocked by locking tongues inserted into aligned grooves, wherein the head faces are interlocked only, when an additional floorboard engages with its longitudinal side with the longitudinal sites of the preceding row of floorboards and thereby pushes with its longitudinal side an end of the locking tongue protruding from the groove into the groove, so that the additional floorboard engages perpendicular to the insertion direction in the opposite groove (19) of the other head face and interlocks the floorboards with one another at their respective head faces.

The invention relates particularly to the mutual, vertical fixation of head faces of floorboards, which are connected on the longitudinal side with an adhesive-free tongue-and-groove joint. The operating principle is based on the idea that a movable part of the locking tongue is deflected laterally when the locking tongue is inserted into the latching groove longitudinally. Preferably, at least a third of the length of the locking tongue comes into engagement with the adjacent groove on the head face. The movable locking tongue does not need to be made of a single piece, but can be formed of several sections.

The travel in the longitudinal direction of the head groove is preferably less than 10 mm and ideally as large as the width of the longitudinal tongue of a floorboard, i.e., for example 1.5 to 4 mm. The actuating section of the locking tongue protruding from the head groove should not be protrude beyond the outermost edge of the floorboard, i.e., in particular not beyond a bottom locking rail. In the interlocked position, the locking tongue is located completely inside the head groove and is preferably flush with the groove bottom of the longitudinal coupling groove. The head face of the locking tongue can also be designed to match the contour of the longitudinal groove bottom.

Importantly, the locking tongue is pre-mounted in one of the grooves, does preferably not protrude beyond the groove opening at the head face and is hence completely enclosed in the groove, whereby only one end of the locking tongue is supposed to protrude from the groove beyond the opening in the longitudinal direction of the floorboard. This end can also be referred to as actuating section for applying a force to the locking tongue in the longitudinal direction of the groove, so as to displace the locking tongue at least partially into the corresponding groove of the adjacent floorboard and to thereby interlock the floorboards at their respective head faces.

The width of the locking tongue in the preassembled state is smaller than the width of the locking channel. If the grooves in the head faces have the same depth, then the locking tongue is maximally as wide as one of the grooves is deep, i.e., is maximally half as wide as the locking channel formed by the grooves. Of course, it would also be possible to construct the grooves in the head faces with different depths. For example, the groove in which the movable part of the blocking tongue is to engage can be constructed to have only 50% of the depth of the other groove.

The fundamental advantage of the floor covering is that there is no longer a need to insert the locking tongue into the locking channel by hammering or pushing. Insertion at a later stage in the process not only requires a separate operating step, but also a sensitive touch, because this operation is performed overhead, depending on the position of the installer, or at least very close to the floor. Conversely, when the locking tongue is preinstalled in one of the grooves, the aforementioned steps of inserting or hammering the looking tongue are completely eliminated, which can save significant time for installation.

Advantageously, the locking tongue does not protrude beyond the head face of the floorboard in the preinstalled state, i.e., it does not hinder installation. A floorboard which is rotated into the preceding longitudinal side of one already installed floorboard can then be rotated downward in the joint region between two head faces, without applying a force, which is different from the solution in EP 1 650 375 A1. Aligning the height of the head faces does not cause the region of the locking channel to interlock, so that the adjacent panels can be lifted without a problem, if required for installation reasons. The protruding end of the locking tongue is moved into the groove only when another row of floorboards is installed, with the result that the locking tongue is moved at least partially from one groove into the corresponding groove of the adjacent floorboard. The grooves forming the locking channel and/or the joint between the floorboards are thereby bridged and interlocked.

The passages of the locking tongue and the grooves are matched to one another, making axial displacement of the locking tongue very smooth. This means that the displaceable part of the locking tongue should be held inside the groove before displacement, but still be easily displaceable. However, the play be small enough to prevent a height change of the abutting floorboards at the head faces. This goal may be attained by providing those regions of the locking tongue that protrude from the first groove and engage in the corresponding groove of the adjacent floorboard with a slightly tighter fit than the other regions of the locking tongue which are displaced only in the axial direction. Movability can be improved with friction-reducing additives or coatings, such as wax, oil, etc., arranged or applied in the region of the contact faces of the components.

In a first embodiment, the locking tongue can be moved against a spring force which enables the locking tongue to move out of the groove bottom at the end face when subsequently unlocked, or to be again completely received in the groove, as viewed from the head face. Locking occurs against the spring force, so that the locking tongue is prebiased in the locked position. The spring force can be generated by a separate spring element, for example a coil spring, or be attained by the intrinsic stress of the material used for the locking tongue.

If the locking tongue cannot be pressed into the locked position by another floorboard, manual interlocking is required, for example, by inserting a fastening clip into the longitudinal coupling groove of the floorboard.

The above description is based on the assumption that the mouth of the groove of the locking tongue is located at the height of a longitudinal coupling groove. However, the grooves at the head faces, or the locking groove, can also be arranged so that the mouth, from which the locking tongue protrudes, is located in the region of a longitudinal locking rail. It is only important that the locking tongue is movable in the longitudinal direction of the locking groove to provide the interlock.

The term "head face" in the context of the present invention refers to a narrow face of a floorboard. The head face is typically the shorter side of the floorboard; however, square floorboards also have a head face with locking tongue and longitudinal sides.

In a practical embodiment, during insertion into the groove, the locking tongue can run up on a sloped surface, so that the locking tongue is displaced sideways in the direction of the corresponding groove. Such sloped surface can be formed in the floorboard or in the groove itself by beveling a partial region of the groove bottom or the entire groove bottom. In other words, the groove depth is varied in the longitudinal direction. If the groove depth increases continuously, then the locking tongue can be formed as a wedge, whereby its longitudinal side facing the groove mouth exits the groove evenly during displacement in the axial direction and engages with the corresponding groove of the adjacent floorboard. The sloped surface is here a wedge-shaped surface. It is significant that the groove depth has dimensions that prevent the locking tongue from unintentionally slipping out of the corresponding groove in the interlocked state. The slope of the sloped surface or wedge-shaped surface is matched to the maximum displacement, i.e., to the length of the end protruding from the groove.

The sloped surface may also be rounded, in which case the sloped surface need not necessarily be straight. Important is the function of the sloped surface, namely that it operates as a contoured counter support to prevent sideways displacement of the locking tongue when moved longitudinally.

Because floorboards are frequently made of a wood-based material and therefore have a high friction coefficient inside the groove, the sloped surface can advantageously be a component of a wedge-shaped body of the locking tongue disposed in the groove. In other words, the locking tongue is made in two parts, wherein the locking tongue is divided into a wedge-shaped body and a push segment. The push segment refers to the longitudinal section of the locking tongue which carries the end protruding from the groove. Depending on the arrangement of the sloped surface, either the push segment or the wedge-shaped body can at least be partially moved into the corresponding groove.

Because it is intended to support the floorboards at their respective head face in particular in the center region of the head face, the wedge-shaped body and the push segment can have approximately the same length, so that the sloped surface and hence also the region of the wedge-shaped body or push segment to be moved are also arranged in the center section of the head face. In a preferred embodiment, approximately the center third of the locking groove is to be at least partially interlocked, in particular when the floorboard is beveled. The friction of the locking tongue is then smaller during a displacement than if the locking tongue were to protrude on the entire length of the groove.

With floorboards having sharp edges or widths greater than 200 mm, it is advantageous if several partial elements protrude from the groove and ensure interlocking in particular also in the corner regions of the joint.

Alternatively, the head face joined can be bridged in the region of the locking channel by spreading, or enable to spread, either the push segment or the wedge-shaped element through mutual operative engagement in the direction to the corresponding groove. For example, the push segment is inserted in a wedge-like fashion into the supported wedge-shaped element, so that the push segment engages between two locking tongues, of which one is displaced in the direction of the corresponding groove. This arrangement has the advantage that the spring effect of the spring legs can push the push segment back again if the floor covering needs to be taken up again. By pushing back, the interlock between the head faces automatically disengages and the actuating end of the locking tongue is again pressed out of the groove, so that the floor covering can be installed a second time.

In another embodiment, the groove receiving the locking tongue has at least one recess, in which the sloped surface is formed and in which a cam of the locking tongue engages. I.e., the groove is provided with an additional contour in form of a recess for forming a sloped surface. This embodiment can be more easily manufactured because, on one hand, a continuous groove can be machined into the end face, in which only the recess needs to be placed. The recess itself is provided in the groove bottom. In particular, the recess can be formed by a saw cut, so that the recess has the contour of a segment of a circle. This segment of a circle can also be rounded in the transition regions towards the groove bottom, so that the recess has approximately a sinusoidal shape. This is governed by the manufacturing process, because the individual floorboards move during the machining operation parallel to the saw blade used for machining the recess. If the movement is not entirely synchronous, the edge region is smoothed, forming rounded transitions.

In theory, the recess may also be a rectangular pocket produced by an end mill or only a bore in the groove bottom, wherein the sloped surface of a bore is limited to the edge of the bore, so that cams projecting into the bore make contact with the sloped surface only at certain points.

In principle, the cam should produce the least possible friction resistance. To this end, the at least one cam is narrower than the locking tongue. The cam itself can be wedged-shaped or rounded. Importantly, the cam is configured to enable it to slide on the sloped surface and not to be hindered. The region of the cam facing the sloped surface should therefore at least in sections have the same orientation as the sloped surface.

In theory, it would be sufficient to provide the locking tongue with only a single cam; however, advantageously at least two cams are provided, because the locking tongue can then be moved parallel. In particular, the locking tongue can have a cam disposed on the end protruding beyond the groove. This cam then runs up on the corner of the groove or slides along this corner, thereby moving the locking tongue out of the groove. This cam is preferably configured as a wedge.

The locking tongue itself can be corrugated to reduce friction, wherein its corrugated sides are facing the finished side and the backside of the floorboard, respectively. In addition, the locking tongue can have locking pins by which the locking tongue is held in the groove and clamped at certain points. The locking pins operate as additional transport retention and have a very small cross-section. They are only provided to hold the locking tongue firmly before it is moved or interlocked. In addition, the locking tongue can be beveled on one of its longitudinal sides to facilitate insertion of the locking tongue into the groove of the abutting floorboard during the interlocking operation.

For the first installation, a locking tongue constructed with two operating components may advantageously have a rated breakpoint which connects the operating components, i.e., the push segment and the wedge-shaped element, with one another. This arrangement reliably prevents components of the locking tongue from accidentally falling out of the groove during transport and installation. It will be understood that the rated breakpoint is destroyed when the locking tongue is inserted into the groove, i.e., during installation.

Within the context of the invention, it would also be feasible to construct the locking tongue from an elastic plastic material which is bent into a curved shape when the protruding end moves into the groove, with the curved section engaging with the adjacent floorboard. With this configuration, too, the spring-bias of the employed plastic material returns the locking tongue again completely into its original groove, so that the floor covering can be later pulled up easily.

In another embodiment, the locking tongue has two legs connected by an hinge, whereby the region of the legs that surrounds the hinge can be brought into engagement with the corresponding groove of the floorboard during displacement of the protruding end into the groove. When using plastic, the hinge can be a film hinge. This embodiment has the advantage that the force for displacing the locking tongue is smaller than with a locking tongue which must be bent into a curved shape. In this embodiment, the legs are not bent. Only the (film) hinge between the legs is bent, which only requires a minimum force. However, this hinge can likewise have a restoring force large enough to return the locking tongue into the initial groove.

The floor covering of the invention can basically be interlocked manually at the head face. This means that after a row of floorboards is installed manually and with manual tools, for example with a pull bar, pressure can be applied to the end of the locking tongue so as to completely depress the locking tongue into the groove, thereby bridging the joint in the region of the locking channel.

In a particularly advantageous embodiment, interlocking at the head face is carried out with an installation method having the features of claim 24. In this installation method, interlocking occurs quasi automatically when another row of floorboards is added, which bridge the rearward joint region of the previously installed row of floorboards. According to the claimed method, the head faces are interlocked only when an additional floorboard engages with the longitudinal sides of the previous row of floorboards and thereby pushes with its longitudinal side an end of the locking tongue protruding from the groove into the groove, so that the locking tongue engages in the opposite groove of the other head face perpendicular to the insertion direction and interlocks the respective end faces of the floorboards with one another.

If the locking tongue is configured so as to return to the initial groove when the bias force is removed, i.e., when the end of the locking tongue automatically protrudes again from the groove, then this represents an automatic release when the floor covering is pulled up. This is also a significant advantage compared to conventional installation methods, where the locking tongue must be removed by moving the floorboards relative to one another.

According to another embodiment, the locking tongue is made of several parts which are captively connected with one another by a connecting element. For example, the connecting element can be a rail protruding beyond the groove, which protrudes from the groove after the locking tongue has been inserted into the groove and is milled off or cut off only during finish machining, so that only not yet interconnected parts of the locking tongue remain in the groove. This approach simplifies handling of the locking tongue during the manufacturing process.

Provided that floorboards have sufficient thickness, additional guide means for the locking tongue may be arranged inside the groove, such as guide sleeves in which the locking tongue can be displaced like a bolt.

The locking tongue should in the unlocked state not protrude beyond a finished or cover layer of the floorboard, i.e., it should be obscured from view when viewed from above, so as not to interfere with transport and handling of the floorboards.

The material for the locking tongue can be a wooden material, for example wood or a material containing wood fibers. Metals and metal alloys as well as composite materials can also be used. Bimetallic or mixed plastic materials may also be used, as well as materials based on thermoplastic or duroplastic materials. The locking tongue can be made, in particular, from fiber-reinforced plastic with a fiber fraction of 20% to 60%.

The concept of the invention can be applied to all floor coverings, where a top cover layer is arranged on a support, for example hardwood coverings, laminates, supports with varnished surfaces as to top covering, cork on support panels, etc. The cover layer can be particularly made of decorative paper with an overlay, which determines the visual appearance of the floorboard. The floor covering can therefore be a parquet floor, a prefinished parquet floor, a hardwood floor or a laminate floor.

BRIEF DESCRIPTION OF THE DRAWING

The invention will now be described in more detail with reference to the exemplary embodiments schematically illustrated in the drawings.

DETAILED DESCRIPTION OF PREFERRED EMBODIMENTS

Figure 1:
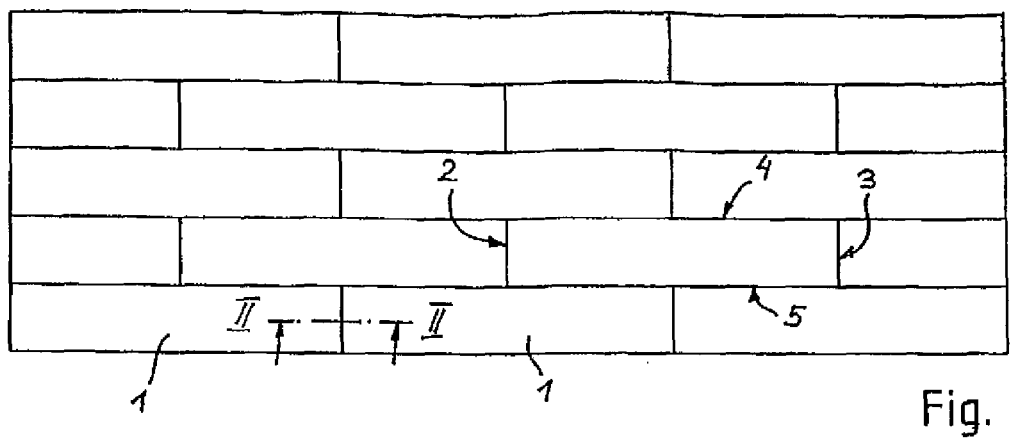
FIG. 1 shows a detail of a floor covering in a top view.

FIG. 1 shows a floor covering made of a plurality of interconnected rectangular floorboards 1. The floorboards 1 include locking rails disposed on their head faces 2, 3 and on their longitudinal sides 4, 5. In the installation position, the locking rails engage in a floor covering with an adjacent panel.

Figure 2:
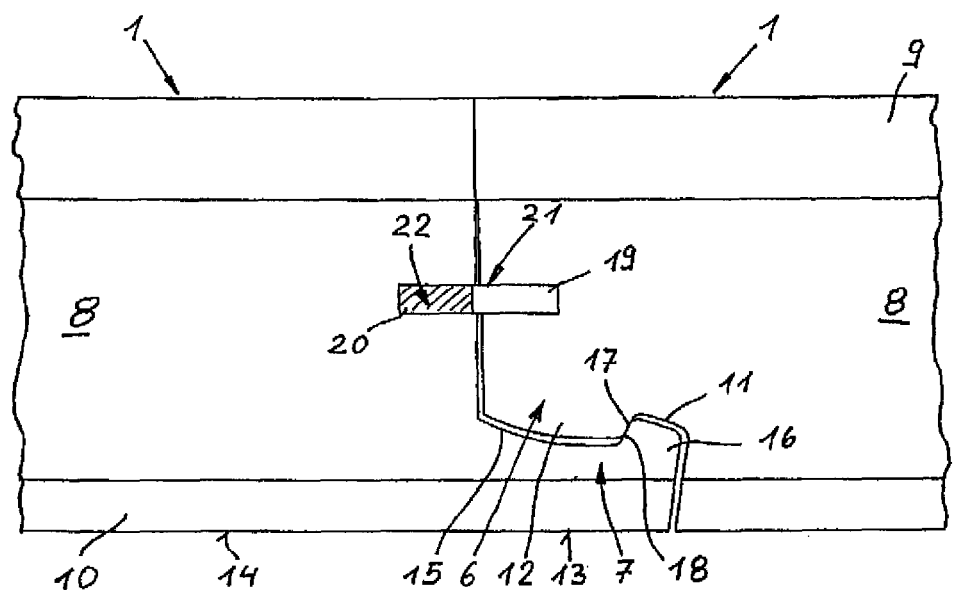
FIG. 2 shows in a side view a vertical cross-section through the joint region at the head faces between two floorboards, taken along the line II-II in FIG. 1.

Locking rails 6, 7 at the head faces 2, 3 of a floorboard 1 are illustrated in FIG. 2, which shows a vertical cross section through the head-face joint region between two floorboards 1, as viewed down on the joint at the head faces 2, 3. The locking rails on the longitudinal sides of a floorboard 1 (not shown) can be configured different from the locking rails 6, 7.

The floorboard 1 is made of a support layer 8 of a fiber material, typically a high-compression or medium-compression fiber panel, wherein the support layer 8 has a top cover layer 9 and a bottom resistance member 10. The cover layer 9 can be made of decorative paper with an overlay, which determines the visual appearance of the floorboards 1. The so-called overlay or sealing forms a useful layer covered with a special resin which provides the floorboards 1 with a high surface-wear resistance. The resistance member 10 on the bottom side of the support layer 8 provides dimensional stability and operates as a moisture barrier.

Each floorboard 1 has a locking rail 6 (first locking rail) disposed on one head face 2 (first head face) and a locking rail 7 (second locking rail) disposed on an opposite head face 3 (second head face). The first locking rail 6 has a first coupling channel 11 which is open at the bottom and a downwardly oriented first coupling bead 12 disposed at the end face. The second locking rail 7 on the opposite second head face 3 of a floorboard is arranged at the bottom and protrudes with respect to the support layer 8. The bottom side 13 of the second locking rail 7 extends in the plane of the bottom side 14 of the floorboard 1. The second locking rail 7 has a second coupling channel 15 which is open at the top and an upwardly oriented second coupling bead 16 disposed at the end face.

When the first looking rail 6 and the second locking rail 7 engage, the first coupling bead 12 engages in the second coupling channel 15, and the second coupling bead 16 engages in the first coupling channel 11. The two sides 17, 18 of the first coupling bead 12 and the second coupling bead 16, which face one another and are sloped in the same direction, contact each other. This produces a pressure point on the sides 17, 18 which generates a force that causes the two floorboards 1 to be pulled towards one another in the region of the cover layer 9, so that the transition in the joint region of the two floorboards 1 has essentially no gap on the cover layer 9.

Grooves 19, 20, which extend over the entire length of the head faces 2, 3, are formed in the head faces 2, 3 of the floorboards 1. As shown in FIG. 2, the grooves 19, 20 of the abutting head faces 2, 3 correspond to one another and form a locking channel 21, in which a locking tongue 22 (cross-hatched) is inserted. The grooves 19, 20 in the head faces 2, 3 are provided above the locking rails 6, 7 in the support layer 8.

Figure 3:
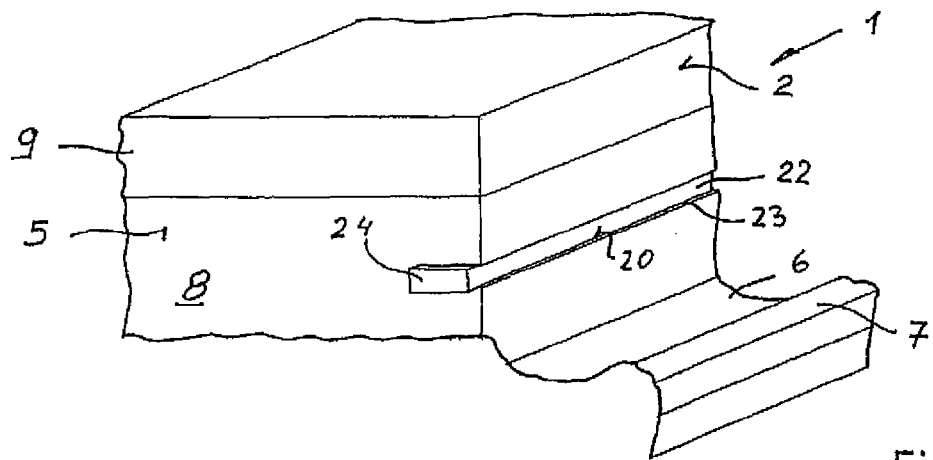
FIG. 3 shows a perspective view of the corner region of a floorboard, viewed onto the head face.

FIG. 3 shows a perspective view onto the head face 2 of a floorboard 1. As shown in the diagram, the locking tongue 22 is located entirely inside the groove 20 in the pre-mounted position and, more particularly, does not protrude beyond the head-face groove mouth 23. However, the end 24 of the locking tongue 22 protrudes from the groove 22 in the region of the longitudinal side 5. FIG. 3 shows an exemplary arrangement of the locking tongue 22 inside the groove 20. The operation and possible embodiments of the locking tongue will now be described with reference to FIGS. 4 to 10.

Figure 4:
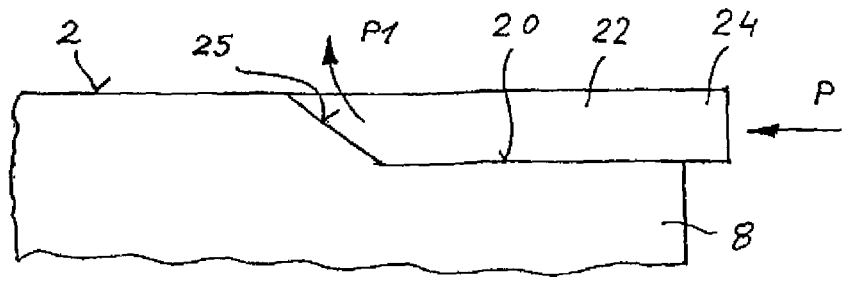
FIGS. 4 to 10 show different embodiments of locking tongues in a top view.

FIG. 4 shows that during insertion into the groove 20, the locking tongue 22 runs up on a sloped surface 25 formed as a wedge in the direction of arrow P, and is therefore pivoted out of the groove 20 in the direction of arrow P1, thereby engaging in an unillustrated manner with the corresponding groove 19 of the adjacent floorboard 1, as seen in the diagram of FIG. 2. In the embodiment of FIG. 4, the groove 20 does not extend beyond the entire length of the head face 2, so that the sloped surface 25 is formed directly by the groove bottom.

Figure 5:
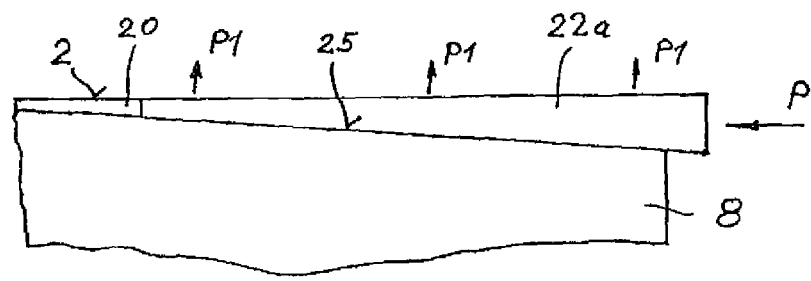

In the exemplary embodiment of FIG. 4, only a portion of the groove bottom is formed as a sloped surface 25. It would also be feasible that the entire groove bottom operates as sloped surface 25, as illustrated in FIG. 5. In this embodiment, not only an end-face region of the locking tongue 22 moves out of the groove 20. Instead, the entire wedge-shaped locking tongue 22a moves out of the groove 20 essentially parallel to the head face 2. This is indicated schematically by the arrows P1.

Figure 6:
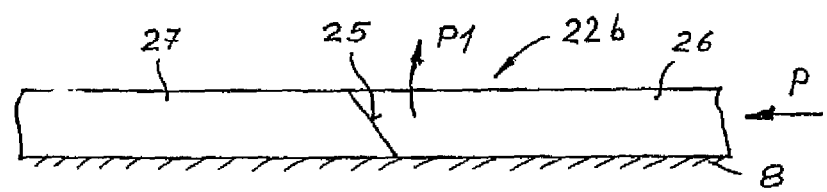

The embodiment of FIG. 6 shows a modification with a locking tongue 22b made in two parts, with a push segment 26 and a wedge-shaped element 27. The push segment 26 and the wedge-shaped element 27 abut, like in the embodiment of FIG. 4, in the region of the sloped surface 25, so that by moving the push segment 26 in the direction of arrow P, the inward end of the push segment 26 is pivoted perpendicular to the direction of arrow P into the unillustrated groove of the other floorboard 1. The arrow P1 indicates the pivoting direction.

Figure 7:
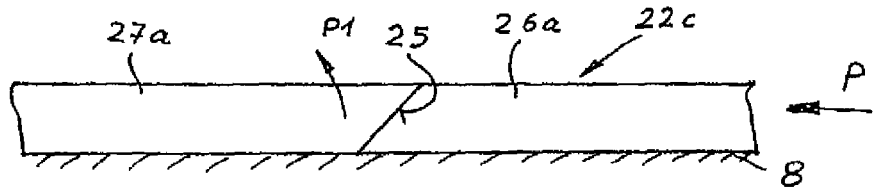

FIG. 7 shows a modification of a two-part locking tongue 22c, wherein the sloped surface 25 is arranged on a wedge-shaped element 27a with an opposite slope, so that displacement of the push segment 26a in the direction of arrow P causes displacement of the wedge-shaped element 27a in the direction of arrow P1. Interlocking is then accomplished not with the push segment 26a, but with the wedge-shaped element 27a.

Figure 8:
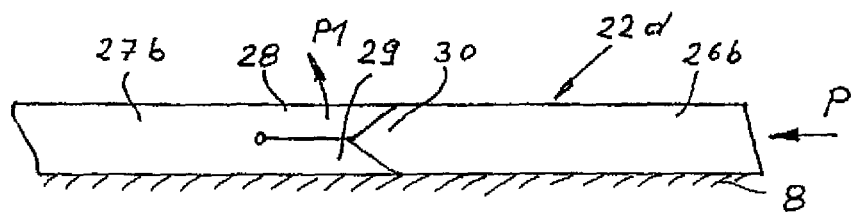

FIG. 8 shows a wedge-shaped element 27b of a coupling tongue 22d having a V-shaped end facing the push segment 26b. A formfittingly matching tip 30 of the push segment 26b engages with this V-shaped end. The V-shaped end is formed by two tongue legs 28, 29, which are urged apart by the tip 30 of the push segment 26b during displacement in the direction of arrow P, so that one tongue leg 28 is urged out of the groove 20 perpendicular to the push direction and moved into the groove 20 for interlocking with the adjacent floorboard 1. At the same time, a partial region of the tip 30 of the push segment engages with the corresponding groove of the adjacent floorboard 1.

Figure 9:
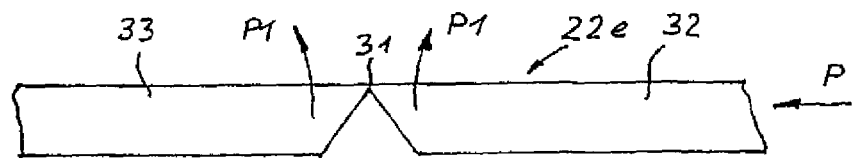

FIG. 9 shows a modification of a locking tongue 22e made of a plastic material. The locking tongue 22e includes two legs 32, 33 which are interconnected by a hinge 31. The legs 32, 33 are beveled in the region of the hinge 31, thereby forming a V-shaped channel in the locking tongue 22e. The legs 32, 33 can be moved relative to one another by way of this channel and by positioning the hinge 31, so that the region of the hinge 31 can be pressed into the groove of the adjacent floorboard 1, thereby aiding a vertical interlock of the adjacent panels.

Figure 10:
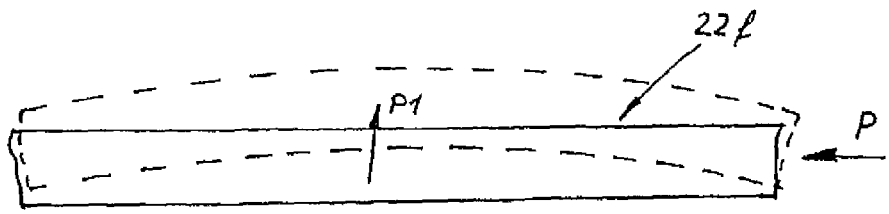

FIG. 10 shows an embodiment of a locking tongue 22f made of an elastic material, which can be bent into a curved shape, without wedge-shaped surfaces and hinges, solely by applying a force in the direction of the longitudinal axis of the coupling spring 22f, wherein the curved section engages with the corresponding groove of the adjacent floorboard. The embodiments of FIGS. 8 to 10 advantageously enable the head spring to automatically return into the initial groove due to the spring action.

Figure 11:
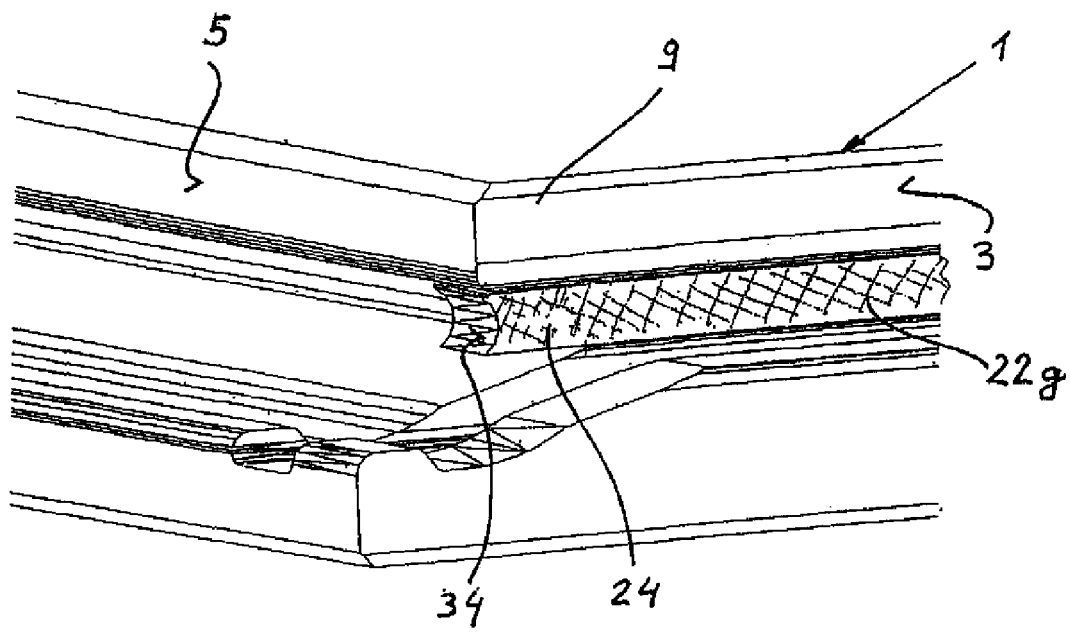
FIGS. 11 and 12 show a perspective view of the corner region of a floorboard with a locking tongue.
Figure 12:
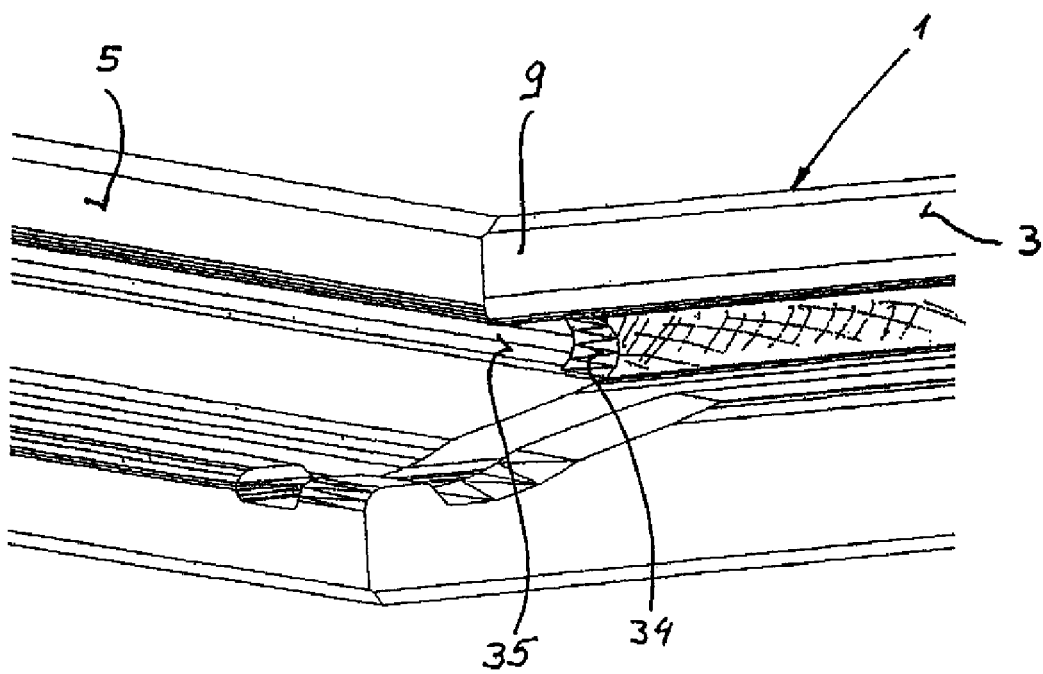
Figure 13:
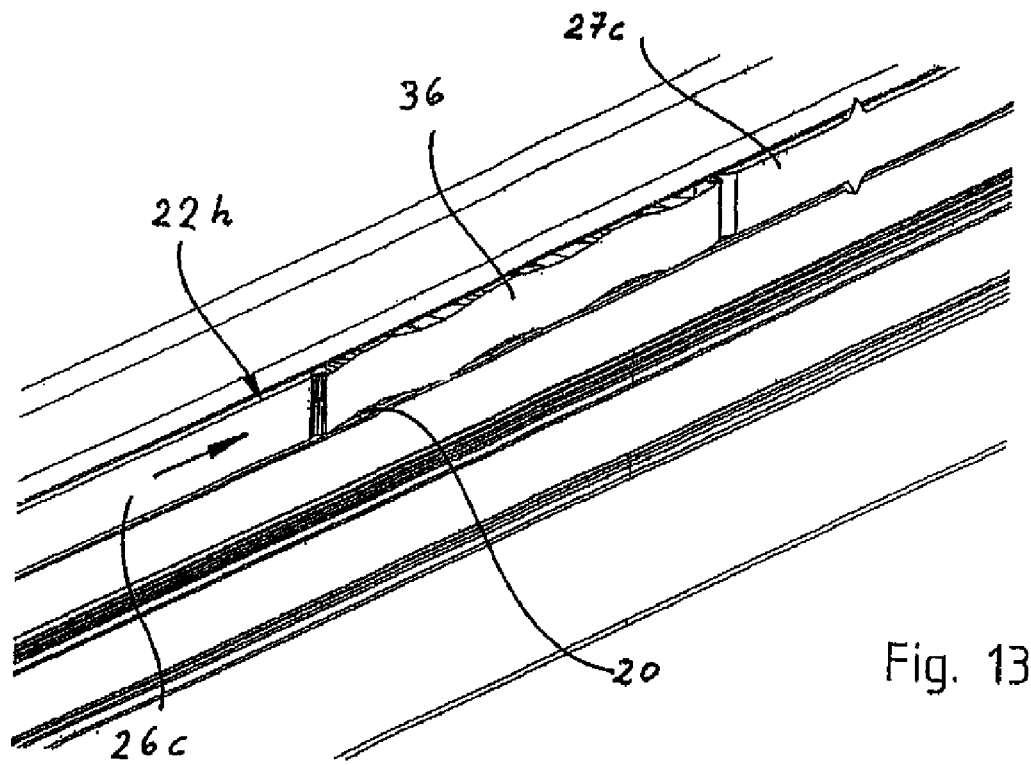
FIGS. 13 and 14 show a perspective view of a center section of a locking tongue.
Figure 14:
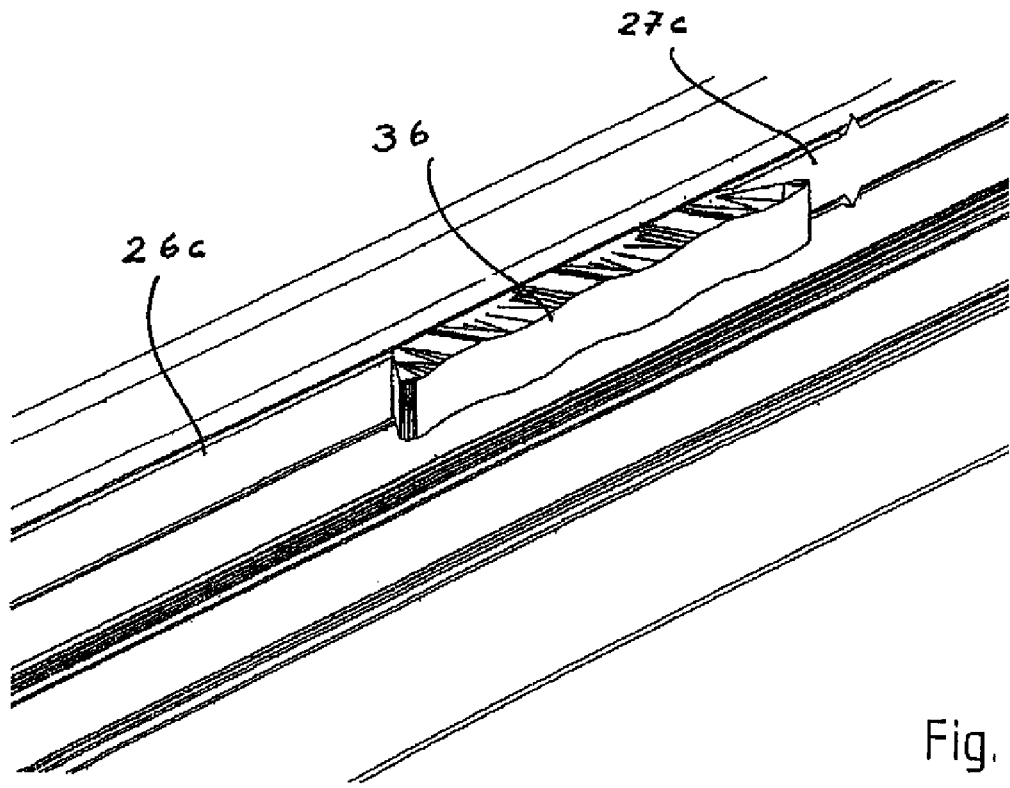

FIGS. 11 and 12 shows the end 24 of a locking tongue 22g in the unlocked position (FIG. 11) and in the locked position (FIG. 12). As the diagrams indicate, the end face 34 of the protruding end 24 of the locking tongue 22g matches the contour of the longitudinal coupling channel 35, i.e., is in this case concave. It is also evident that the locking tongue 22g does not protrude beyond the finished or cover layer 9 of the floorboard 1 in the unlocked state, so that the locking tongue 22g is not visible from above and does not interfere with the transport, handling and installation of the floorboards 1. FIGS. 13 and 14 show a modification of a locking tongue 22h made in three parts. A rear part of the locking tongue 22h is spiked into the sides of groove 20 and thus prevented from moving in the longitudinal direction of groove 20. The rear part can also be referred to as wedge-shaped element 27c. The wedge-shaped element 27c serves as a counter support for a trapezoidal center section operating as locking element 36. In this embodiment, unlike in the aforedescribed embodiments, the push segment 26c which can be displaced in the longitudinal direction is not moved sideways out of the groove, but only the locking element 36 which is supported both on a wedge surface on the wedge-shaped element 27c and on a wedge surface on the push segment 26c.

Figure 15:
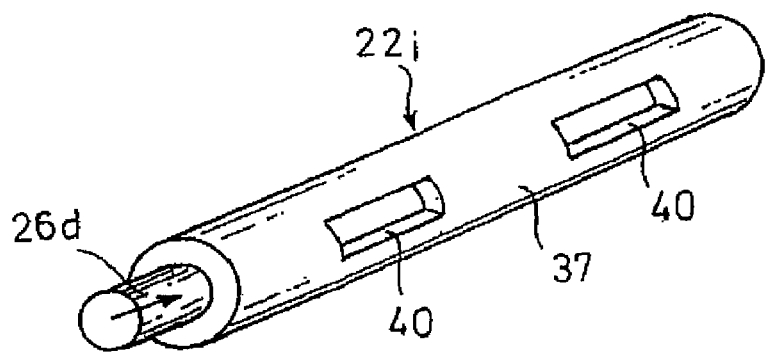
FIGS. 15 to 17 show another embodiment of a locking tongue in a perspective view and a cross-sectional view.
Figure 16:
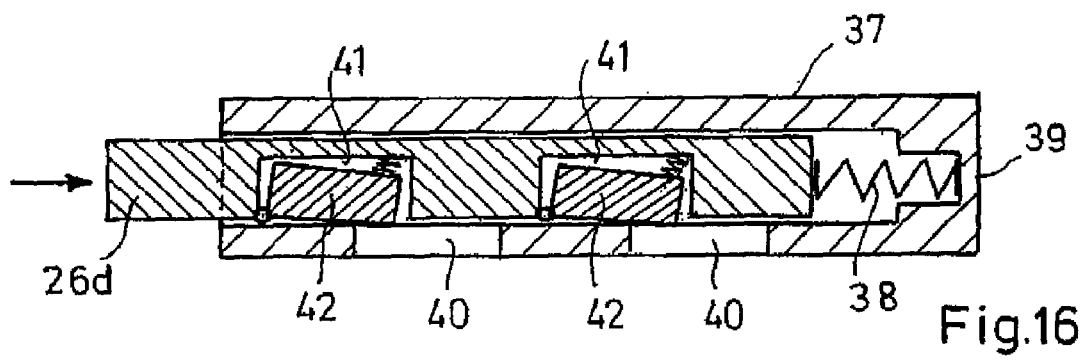
Figure 17:
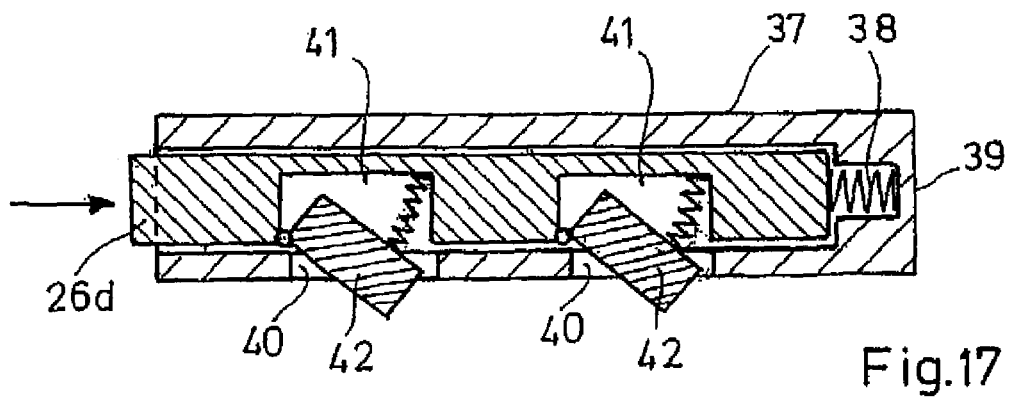

FIGS. 15 to 17 illustrate an embodiment of a locking tongue 22i which includes a push segment 26d and a sleeve 37 guiding the push segment 26d. The push segment 26d can be displaced inside the sleeve 37 against the spring force of a spring 38. The spring is supported by a bottom 39 of the sleeve 37. The sleeve 37 has lateral openings 40 which are arranged so that locking elements 42 supported in pockets 41 of the push segment 26d can be rotated out of the openings by a spring force and thereby engage in an unillustrated manner in a groove of an adjacent floorboard so as to cause the head faces of adjacent floorboards to interlock. This type of locking tongue 22i can be employed as a pre-mounted unit in particular with thicker floorboards, providing a reliable and reversible interlock between the grooves at the respective head faces.

Figure 18:
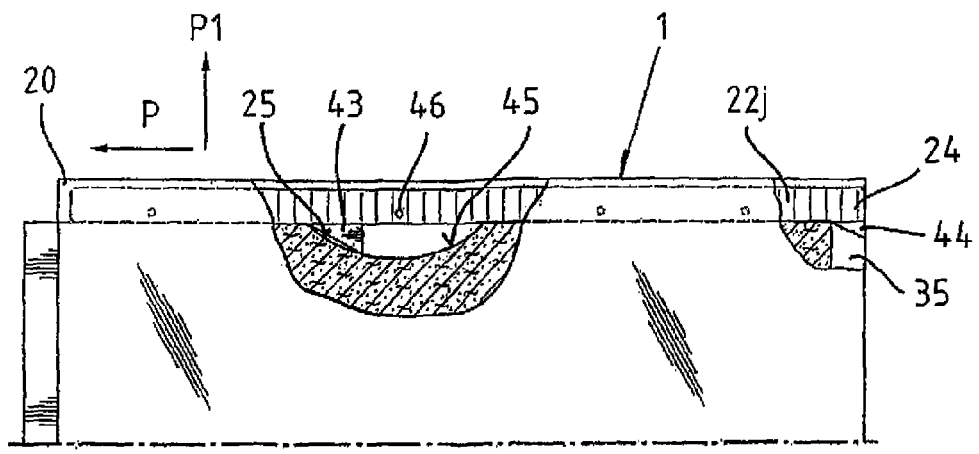
FIGS. 18 and 19 show in partial cross-section two additional embodiments of locking tongues within a floorboard.

FIG. 18 shows a modification of a locking tongue 22j which is once more located in a groove 20 of the floorboard 1 and which is again displaced in the direction of arrow P and protrudes from the groove 20 in the direction of arrow P1 when two floorboards are interlocked. The locking tongue 22j is hereby displaced parallel, as a result of two cams 43, 44 extending in the direction of the groove bottom of groove 20. A first cam 43 is located in the transition region from the center to the (in the image plane) left third of the locking tongue 22j. The cam 43 has a triangular shape and protrudes into a recess 45 configured as a section of a circle. Recess 45 is, for example, produced by a disk-shaped saw blade inserted into groove 20. The cam 43 also matches the depth of the recess 45, so that the locking tongue 22j makes contact with the groove bottom in the unlocked state. Its front end 24 does here not protrude beyond the floorboard 1. The second cam 44 which extends into the longitudinal coupling channels 35 is located at this front end. This cam 44 runs up on the 90° corner in the transition region between the longitudinal coupling channel 35 and the head-face groove 20. Because of the small travel, this second cam 44 is shorter and does therefore not protrude as far in the direction of the coupling channel 35 as the cam 43 in recess 45. The geometries of cams 43, 44 can be matched to allow a parallel displacement of the locking tongue 22j.

As also seen in FIG. 18, several locking pins 46 are distributed over the length of the locking tongue 22j. The locking pins 46 are small projections on the top side or bottom side of the locking tongue 22j and are provided to hold the locking tongue 22j firmly in the illustrated position.

Figure 19:
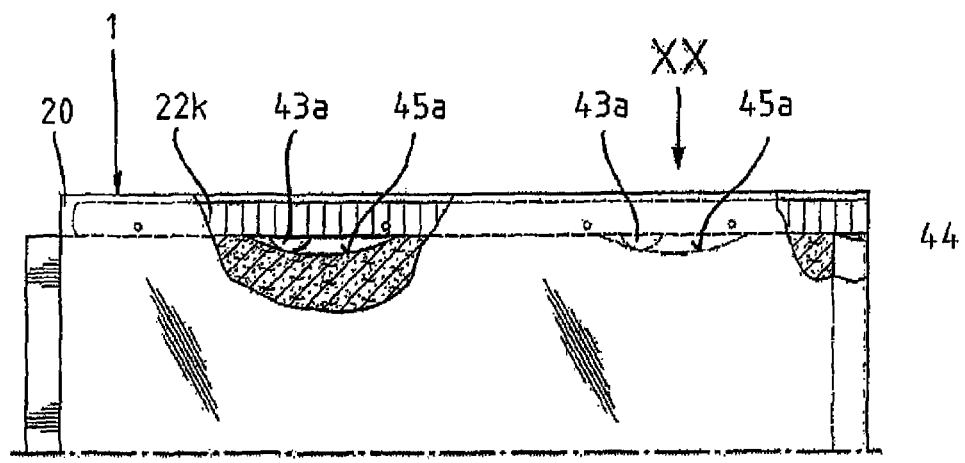

The embodiment of FIG. 19 is different from that of FIG. 18 in that the recess 45a is less deep than in the embodiment of FIG. 18, and that cam 43a is correspondingly shorter.

Another difference is that in the embodiment of FIG. 19 two recesses 43a and accordingly also two rounded recesses 45a and two cams 43a are provided, so that the locking tongue 22k of this embodiment is additionally supported inside the groove 20.

Figure 20:
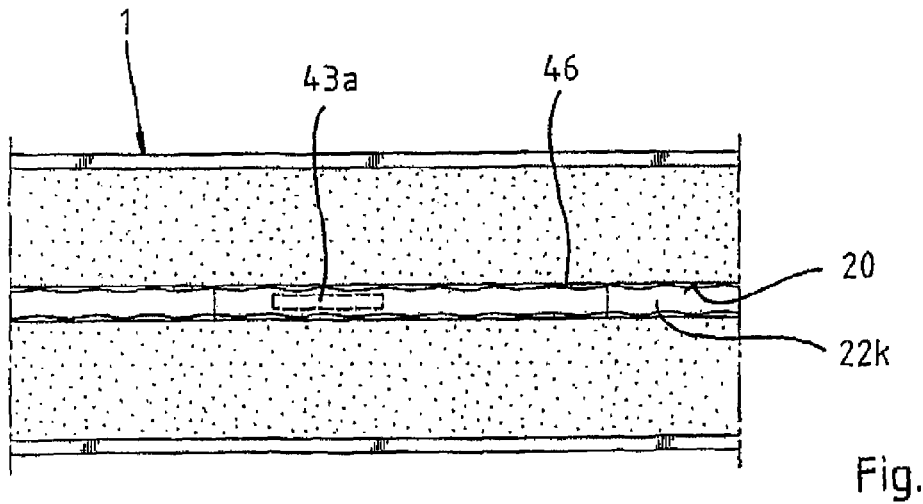
FIG. 20 shows the view X-X of FIG. 19.

FIG. 20 shows the locking tongue 22k in a front view. This perspective clearly indicates that the locking tongue 22k is corrugated towards the top and bottom side of the groove 20, which reduces the contact areas between the locking tongue 22k and the groove 20 and decreases friction. As also indicated, the locking pins 46 are arranged both on the top side and the bottom side of the locking tongue 22k, holding the locking tongue 22k in the groove 20. As further illustrated, the width of the cam 43a shown here as a dashed line is smaller than the width of the basic body of the locking tongue 22k, so as to make the friction between the cam 43a and the sloped surface inside the recess 45 as small as possible.

What is claimed is:

1. A method for installing a floor covering, comprising the steps of:
    placing a longitudinal side of an additional floorboard against a longitudinal side of a floorboard of a preceding row of floorboards, and interlocking the longitudinal sides with a locking rail arranged at the longitudinal sides;
    applying a force to a protruding end portion of a locking tongue arranged in one groove disposed in a head face of one floorboard in a longitudinal direction of the one groove, said protruding end portion protruding beyond a longitudinal end of the one groove, with the applied force forcing a first portion of the locking tongue into a corresponding groove of an abutting head face of a floorboard of a preceding row of floorboards aligned with the one groove, wherein the end portion of the longitudinal tongue substantially remains within the one groove, resulting in interlocked panels.

2. A floor covering, comprising:
    a plurality of interlockable floorboards, each defined by opposite head faces and opposite longitudinal sides, said head faces and longitudinal sides having interlocking rails to engage in an installation position with interlocking rails of adjacent floorboards, wherein each of the head faces has a groove positioned such that the groove of one head face and the groove of an abutting head face are aligned and form a locking channel;
    a locking tongue preinstalled in one of the grooves for placement in the locking channel, wherein the locking tongue has an end portion that protrudes beyond a longitudinal end of the one groove in facing relationship to one of the longitudinal sides of the floorboard and moveable from the one groove into a corresponding groove of the adjacent floorboard, whereby applying a force to the end portion of the locking tongue in a longitudinal direction of the one groove forces a first portion of the longitudinal tongue into the corresponding groove, with the end portion of the longitudinal tongue substantially remaining within the one groove, resulting in interlocked panels.

3. The floor covering of claim 2, wherein the locking tongue has a wedge-shaped element which is arranged in the one groove and bottom surface which is at least partially sloped in a longitudinal direction of the one groove.

4. The floor covering of claim 3, wherein the looking tongue has a push segment which supports the end protruding from the one groove and is in operative engagement with the sloped bottom surface, said push segment being at least partially moveable into the corresponding groove of the adjacent floorboard.

5. The floor covering of claim 3, further comprising a push segment which supports the end of the looking tongue protruding from the one groove and is in operative engagement with the wedge-shaped element for moving the wedge-shaped element, at least partially, into the corresponding groove of the adjacent floorboard.

6. The floor covering of claim 3, further comprising a push segment to support the end of the locking tongue protruding from the groove, wherein either the push element or the wedge-shaped element is spread apart through mutual operative engagement at the end face in a direction of the corresponding groove of the adjacent floorboard.

7. The floor covering of claim 3, further comprising a push segment to support the end of the locking tongue protruding from the groove, and a locking element arranged between the wedge-shaped element and the push segment and moveable, at least partially, into the corresponding groove of the adjacent floorboard by moving the push segment.

8. The floor covering of claim 3, wherein the wedge-shaped element and a push segment supporting the end protruding from the groove are connected with one another by way of a rated breakpoint, wherein insertion of the locking tongue destroys the rated breakpoint.

9. The floor covering of claim 2, wherein the one groove has at least one recess in which a sloped surface is formed, said locking tongue having a cam to engage the recess.

10. The floor covering of claim 9, wherein the cam is sized narrower in width than the locking tongue.

11. The floor covering of claim 9, wherein the cam is wedge-shaped.

12. The floor covering of claim 9, wherein the cam is rounded.

13. The floor covering of claim 9, wherein the recess has a curved contour.

14. The floor covering of claim 2, wherein the end portion of the locking tongue includes a cam.

15. The floor covering of claim 2, wherein the locking tongue has a corrugated side in confronting relationship to a finished side of the floorboards and a corrugated side in confronting relationship to a bottom side of the floorboards.

16. The floor covering of claim 2, wherein the locking tongue has locking pins to spot-hold the locking tongue in the one groove.

17. The floor covering of claim 2, further comprising a sleeve insertable into the one groove, wherein the locking tongue has a push element to support the protruding end, said push element being guided in the sleeve and comprising at least one spring-biased locking element, which pivots out of a lateral opening of the sleeve, when the push segment is moved inside the sleeve under the effect of a spring force, and at least partially moves into the corresponding groove.

18. The floor covering of claim 2, wherein an end face of the protruding end of the locking tongue has a contour to match a contour of a longitudinal coupling channel.

19. The floor covering of claim 2, wherein the locking tongue is sized so as not to protrude beyond a finished or cover layer in an unlocked state.

20. The floor covering of claim 2, for construction of a parquet floor, a prefinished parquet floor, a hardwood floor, or a laminate floor.

* * * * *

UNITED STATES PATENT AND TRADEMARK OFFICE
CERTIFICATE OF CORRECTION

PATENT NO. : 8,302,367 B2
APPLICATION NO. : 12/376491
DATED : November 6, 2012
INVENTOR(S) : Guido Schulte It is certified that error appears in the above-identified patent and that said Letters Patent is hereby corrected as shown below:

Column 2 under BACKGROUND OF THE INVENTION line 2, change "..the object is attained by a devise by a floor.." to -- ..the object is attained by a floor.. --.

Column 11, line 51, claim 3, change "..one groove and bottom surface.." to -- one groove and a bottom surface --.

Signed and Sealed this
Fifth Day of February, 2013

Teresa Stanek Rea
*Acting Director of the United States Patent and Trademark Office*